(12) United States Patent
Hikichi et al.

(10) Patent No.: US 10,677,101 B2
(45) Date of Patent: Jun. 9, 2020

(54) COMBINED HEAT AND POWER SYSTEM AND OPERATING METHOD OF COMBINED HEAT AND POWER SYSTEM

(71) Applicant: Panasonic Corporation, Osaka (JP)

(72) Inventors: Takumi Hikichi, Osaka (JP); Yoshihiko Motohashi, Osaka (JP); Osamu Kosuda, Saitama (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/031,436

(22) Filed: Jul. 10, 2018

(65) Prior Publication Data
US 2019/0024538 A1 Jan. 24, 2019

(30) Foreign Application Priority Data
Jul. 20, 2017 (JP) .................. 2017-141155

(51) Int. Cl.
| F01K 9/02 | (2006.01) |
| F01K 7/30 | (2006.01) |
| F01K 13/02 | (2006.01) |
| F01D 15/10 | (2006.01) |
| F01D 17/08 | (2006.01) |

(52) U.S. Cl.
CPC .............. F01K 9/023 (2013.01); F01K 7/30 (2013.01); F01K 13/02 (2013.01); F01D 15/10 (2013.01); F01D 17/085 (2013.01)

(58) Field of Classification Search
CPC . F01K 9/023; F01K 13/02; F01K 7/30; F01D 15/10; F01D 17/085

USPC .................................... 60/646, 657, 660–664
See application file for complete search history.

(56) References Cited

U.S. PATENT DOCUMENTS

| 2003/0213246 A1* | 11/2003 | Coll | ...................... F01K 17/02 |
| | | | 60/653 |
| 2009/0151356 A1* | 6/2009 | Ast | ...................... F01K 23/101 |
| | | | 60/660 |

(Continued)

FOREIGN PATENT DOCUMENTS

| EP | 2767679 A1 | 8/2014 |
| EP | 2930319 A1 | 10/2015 |
| JP | 2013-181398 | 9/2013 |

OTHER PUBLICATIONS

The Extended European Search Report dated Jan. 2, 2019 for the related European Patent Application No. 18183047.2.

*Primary Examiner* — Hoang M Nguyen
(74) *Attorney, Agent, or Firm* — McDermott Will & Emery LLP

(57) ABSTRACT

A combined heat and power system is provided with a Rankine cycle passage, a heat medium passage, an evaporator, an expander, a condenser, a pump, a temperature sensor, a sensor, and a controller. The evaporator receives the heat from the heat medium to heat a working fluid. The temperature sensor detects the temperature of the heat medium after radiating heat for heating the working fluid. The sensor detects the pressure of the working fluid flowing between the outlet of the evaporator and the inlet of the expander. The controller adjusts the rotation speed of the pump based on the temperature detected by the temperature sensor, and in addition, adjusts the rotation speed of the expander based on the pressure detected by the sensor.

13 Claims, 6 Drawing Sheets

(56) References Cited

U.S. PATENT DOCUMENTS

| | | | |
|---|---|---|---|
| 2010/0034684 A1* | 2/2010 | Ast | F01K 21/005 418/84 |
| 2011/0308252 A1* | 12/2011 | Kopecek | F01K 25/10 60/653 |
| 2012/0240575 A1* | 9/2012 | Mori | F02G 5/00 60/616 |
| 2014/0075941 A1* | 3/2014 | Adachi | F01K 13/02 60/646 |
| 2014/0224469 A1 | 8/2014 | Mirmobin et al. | |
| 2014/0250886 A1* | 9/2014 | Mizoguchi | F01K 23/10 60/663 |

\* cited by examiner

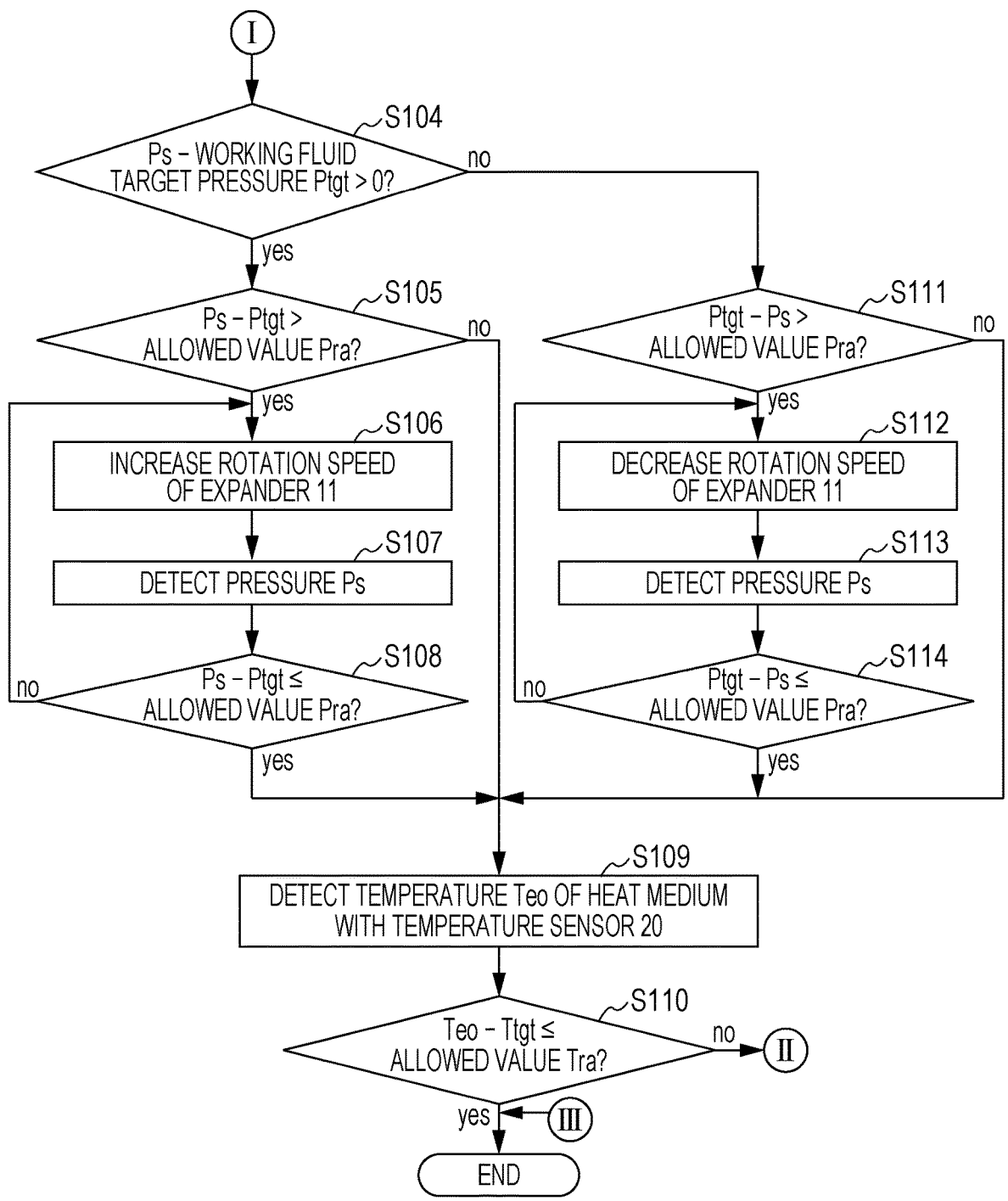

COMBINED HEAT AND POWER SYSTEM AND OPERATING METHOD OF COMBINED HEAT AND POWER SYSTEM

BACKGROUND

1. Technical Field

The present disclosure relates to a combined heat and power system, and an operating method of a combined heat and power system.

2. Description of the Related Art

A combined heat and power (CHP) system is a system configured so that multiple forms of energy, such as heat and electric power, are obtained at the same time from single or multiple resources. For example, Japanese Unexamined Patent Application Publication No. 2013-181398 describes a binary power generator in which heated water, which is primarily used as a heat source for generating power, is additionally used for a secondary purpose.

As illustrated in FIG. 4, Japanese Unexamined Patent Application Publication No. 2013-181398 describes a binary power generator 100. The binary power generator 100 is provided with an evaporator 102, an expander 103, a condenser 104, and a circulator pump 105. The evaporator 102 causes a liquid working medium to evaporate using heated wastewater from a factory or heated water from a hot spring as a heat source. The evaporator 102, the expander 103, the condenser 104, and the circulator pump 105 are connected by pipes in a closed loop that circulates the working medium, and the working medium circulates through the evaporator 102, the expander 103, the condenser 104, and the circulator pump 105 in order. The binary power generator 100 is provided with a generator 107 adjacent to the expander 103, and generates power with the generator 107 using rotational driving force obtained by the expander 103.

In the case in which heated water used primarily as a heat source for generating power is additionally used for a secondary purpose, it is necessary to control and manage the temperature of the heated water discharged from the evaporator 102 at a temperature suited to the process on the secondary side. The binary power generator 100 is provided with a controller 109. The controller 109 adjusts the circulating flow of the working medium supplied to the evaporator 102 so that the temperature of the heated water on the outlet side of the evaporator 102 becomes a predetermined temperature, and adjusts the pressure of the working medium supplied to the evaporator 102 in correspondence with the next increase or decrease of the circulating flow of the working medium. The binary power generator 100 additionally is provided with a bypass passage 110, a flow rate adjustment valve 111, and a pressure adjustment valve 112. The bypass passage 110 returns part of the working on the outlet side of the circulator pump 105 back to the inlet side. The flow rate adjustment valve 111 adjusts the flow rate of the working medium that flows through the bypass passage 110. The pressure adjustment valve 112 adjusts the pressure of the working medium supplied to the evaporator 102. The controller 109 outputs control signals to the flow rate adjustment valve 111 and the pressure adjustment valve 112, and adjusts the circulating flow and pressure of the working medium.

The binary power generator 100 additionally is provided with a first temperature measuring means 113a, a second temperature measuring means 113b, a first pressure measuring means 114a, and a second pressure measuring means 114b. The first temperature measuring means 113a measures the temperature Tw of heated water on the outlet side of the evaporator 102. The second temperature measuring means 113b measures the temperature T2 of the working medium on the inlet side of the expander 103. The first pressure measuring means 114a measures the pressure P1 of the working medium on the inlet side of the evaporator 102. The second pressure measuring means 114b measures the pressure P2 of the working medium on the outlet side of the evaporator 102.

SUMMARY

The technology described in Japanese Unexamined Patent Application Publication No. 2013-181398 has room for improvement from the perspective of raising the power-generating efficiency of the binary power generator while also appropriately adjusting the temperature of the heated water supplied for the secondary purpose. Accordingly, one non-limiting and exemplary embodiment provides a combined heat and power system that is useful for raising the power-generating efficiency while also appropriately adjusting the temperature of a heat medium supplied for a secondary purpose.

In one general aspect, the techniques disclosed here feature a combined heat and power system comprising: a Rankine cycle passage in which a working fluid flows; a heat medium passage in which a heat medium supplied from a heat source flows; an evaporator that is disposed in the Rankine cycle passage and that directly or indirectly receives heat from the heat medium to heat the working fluid; an expander that is disposed in the Rankine cycle passage and that expands the working fluid flowing from the evaporator to generate rotational power; a condenser that is disposed in the Rankine cycle passage and that cools the working fluid flowing from the expander; a pump that is disposed in the Rankine cycle passage and that pumps the working fluid flowing from the condenser to the evaporator; a temperature sensor that detects a temperature of the heat medium after radiating heat for heating the working fluid; a sensor for determining a pressure of the working fluid flowing between the outlet of the expander and inlet of the expander in the Rankine cycle passage; and a controller that controls a rotation speed of the pump based on the temperature detected by the temperature sensor and that controls a rotation speed of the expander based on the pressure determined based on the result of the detection by the sensor.

The above combined heat and power system is useful for raising the power-generating efficiency while also appropriately adjusting the temperature of a heat medium supplied for a secondary purpose.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 2A to 2C are flowcharts illustrating an example of the operations of the combined heat and power system of the present disclosure;

DETAILED DESCRIPTION

Figure 1:
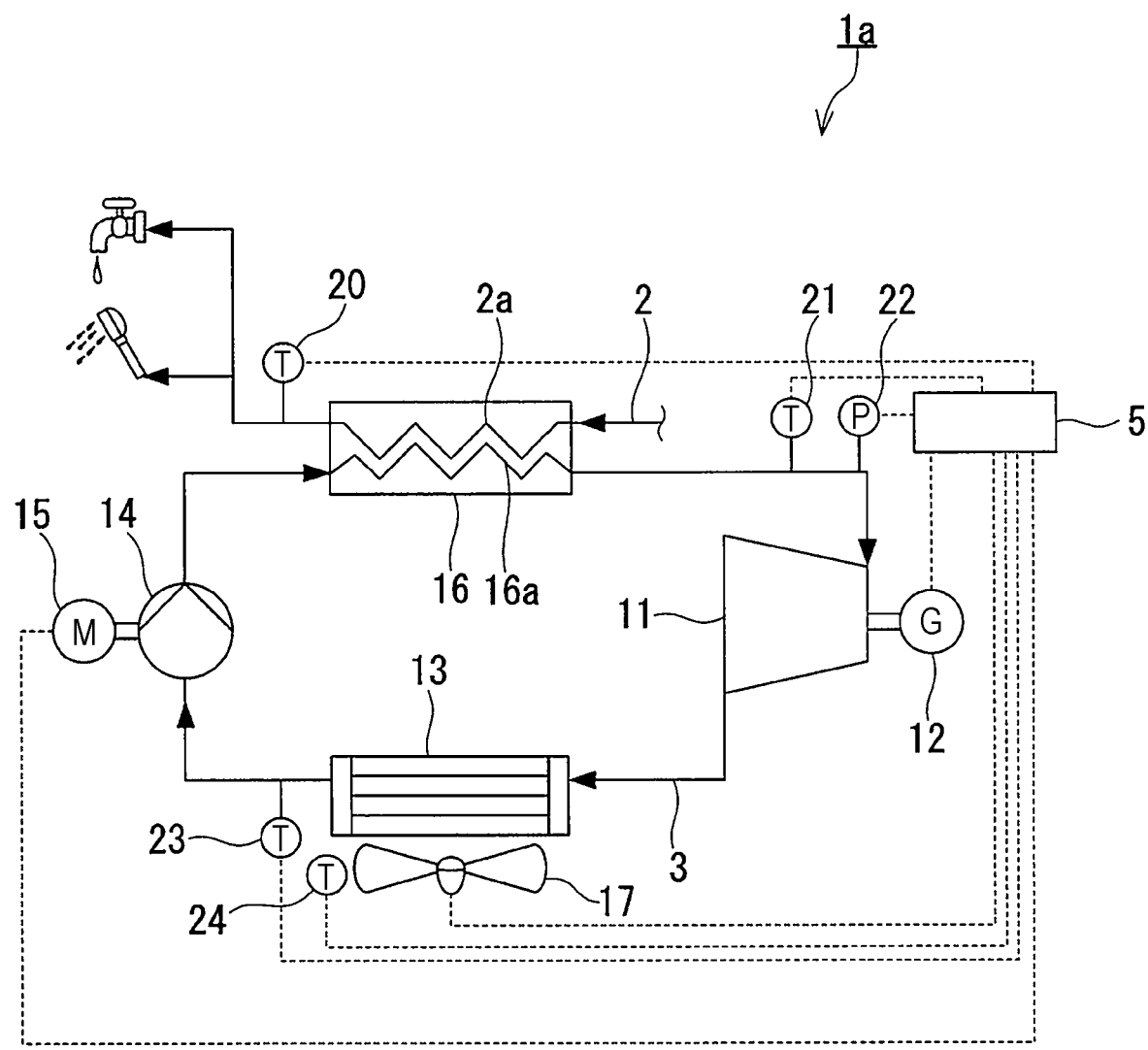
FIG. 1 is a configuration diagram illustrating an example of a combined heat and power system of the present disclosure.

<Underlying Knowledge Forming Basis of the Present Disclosure>

In recent years, not only large-scale CHP system, but also CHP systems which may be deployed in relatively small-scale facilities, such as hospitals, schools, and libraries, as well as CHP systems for general households (micro-CHP systems) are becoming a focus of attention. In a CHP system, as described in Japanese Unexamined Patent Application Publication No. 2013-181398, the Rankine cycle may be used for the power generation cycle. In the related art, the Rankine cycle is used in the bottoming cycle in facilities such as power plants, which are often operated while maintaining a fixed power output, and the operating parameters of the Rankine cycle are also fixed. However, in a CHP system for a small-scale facility or a CHP system for a general household, fluctuations in the heat demand, such as the quantity of heat to use at the secondary usage point, the demanded temperature of the heat medium used for the secondary purpose, and the like exert a large influence on the performance and the efficiency of the CHP system. In a CHP system for a small-scale facility or a CHP system for a general household, the demanded quantity of heat and heat medium temperature at the secondary usage point are different for every facility or household. Also, even in the same facility or the same household, in the case of using heat for heating, for example, the heating load and/or the temperature demanded of the heat medium for heating fluctuates greatly between daytime and nighttime. Fluctuations in the heating load and/or fluctuations in the temperature demanded of the heat medium for heating are also large between wintertime and summertime. In the case of using heat for supplying hot water, since the water heating load occurs temporarily, the demanded quantity of heat and the demanded temperature of the heat medium used at the secondary usage point fluctuates greatly. Consequently, in a CHP system for a small-scale facility or a CHP system for a general household, it is important to be able to cope with large fluctuations of heat demand and demanded heat medium temperature.

According to the technology described in Japanese Unexamined Patent Application Publication No. 2013-181398, the rotation speed of the circulator pump 105 is increased in the case in which the absolute value of the difference between the temperature Tw of heated water on the outlet side of the evaporator 102 and a target value Ts of the wastewater temperature is greater than an allowed value Tp, and additionally, Tw is greater than Ts. In addition, a degree of superheat $\Delta Tv$ of the working medium is computed using the pressure P2 of the working medium on the outlet side of the evaporator 102 and the temperature T2 of the working medium on the inlet side of the expander 103. Furthermore, the valve position of the pressure adjustment valve 112 is adjusted so that the degree of superheat $\Delta Tv$ becomes greater than a lower limit value. According to investigation by the inventors, in this case, there is a possibility of a decreased difference between the pressure of the working medium on the inlet side of the expander 103 and the pressure of the working medium on the outlet side of the expander 103. The reason for this is because adjusting the valve position of the pressure adjustment valve 112 causes a drop in the pressure of the working medium supplied to the expander 103. For this reason, there is a possibility that the power output with respect to the amount of energy absorbed by the evaporator 102 may decrease, and the power-generating efficiency may fall.

According to the technology described in Japanese Unexamined Patent Application Publication No. 2013-181398, the valve position of the flow rate adjustment valve 111 is adjusted in the case in which the absolute value of the difference between the temperature Tw of heated water on the outlet side of the evaporator 102 and the target value Ts of the wastewater temperature is greater than the allowed value Tp, and additionally, Tw is equal to or less than Ts. With this arrangement, the flow of the working medium that returns from the outlet side to the inlet side of the circulator pump 105 is raised by a predetermined amount, and the circulating flow of the working medium supplied to the evaporator 102 is decreased in stages. In addition, the rotation speed of the circulator pump 105 is adjusted so that the $\Delta Tv$ becomes greater than a lower limit value. According to investigation by the inventors, in this case, there is a possibility that the net power-generating efficiency obtained by subtracting the power consumed internally inside the binary power generator 100 from the power output of the generator 107 may fall. The reason for this is because since the circulating flow of the working medium flowing through the bypass passage 110 increases, the power consumption of the circulator pump 105 with respect to the circulating flow of the working medium supplied to the evaporator 102 increases.

Accordingly, the inventors thoroughly investigated a combined heat and power system that is useful for raising the power-generating efficiency while also appropriately adjusting the temperature of a heat medium supplied for a secondary purpose. As a result, the inventors devised the combined heat and power system of the present disclosure.

A first aspect of the present disclosure provides a combined heat and power system provided with:

a Rankine cycle passage in which a working fluid flows;

a heat medium passage in which a heat medium supplied from a heat source flows;

an evaporator that is disposed in the Rankine cycle passage and that directly or indirectly receives heat from the heat medium to heat the working fluid;

an expander that is disposed in the Rankine cycle passage and that expands the working fluid flowing from the evaporator to generate rotational power;

a condenser that is disposed in the Rankine cycle passage and that cools the working fluid flowing from the expander;

a pump that is disposed in the Rankine cycle passage and that pumps the working fluid flowing from the condenser to the evaporator;

a temperature sensor that detects a temperature of the heat medium after radiating heat for heating the working fluid;

a sensor for determining a pressure of the working fluid flowing between the outlet of the expander and inlet of the expander in the Rankine cycle passage; and a controller that controls a rotation speed of the pump based on the temperature detected by the temperature sensor and that controls a rotation speed of the expander based on the pressure determined based on the result of the detection by the sensor.

According to the first aspect, the rotation speed of the pump may be adjusted on the basis of the temperature detected by the temperature sensor. With this arrangement, the circulating flow of the working fluid may be varied, and the quantity of heat recovered by the working fluid in the evaporator may be adjusted. In addition, the rotation speed of the expander may be adjusted on the basis of the pressure determined according to the result of the detection by the sensor. With this arrangement, the pressure of the working fluid at the inlet of the expander of the Rankine cycle may be adjusted to a desired pressure. In this way, since the pressure of the working fluid at the inlet of the expander may be adjusted to a desired pressure irrespectively of the adjustment of the circulating flow of the working fluid, the power-generating efficiency of the Rankine cycle may be kept high consistently. As a result, the combined heat and power system according to the first aspect is useful for raising the power-generating efficiency of the Rankine cycle while also appropriately adjusting the temperature of a heat medium supplied for a secondary purpose after radiating heat to heat the working fluid. Moreover, in the combined heat and power system according to the first aspect, the bypass passage, flow rate adjustment valve, and pressure adjustment valve described in Japanese Unexamined Patent Application Publication No. 2013-181398 are unnecessary, allowing for a simpler configuration.

A second aspect of the present disclosure provides a combined heat and power system wherein, in addition to the first aspect, the controller adjusts the rotation speed of the pump to keep the temperature detected by the temperature sensor inside a predetermined temperature range, and adjusts the rotation speed of the expander to keep the pressure determined according to the result of the detection by the sensor inside a predetermined pressure range. According to the second aspect of the present disclosure, the temperature of the heat medium supplied for the secondary purpose after radiating heat to heat the working fluid may be kept in a predetermined temperature range depending on the demand. Additionally, by adjusting the rotation speed of the expander, the pressure of the working fluid at the inlet of the expander may be kept in a predetermined pressure range suited to high power-generating efficiency.

A third aspect of the present disclosure provides a combined heat and power system wherein, in addition to the second aspect, the controller increases the rotation speed of the pump in a case in which the temperature detected by the temperature sensor is higher than an upper limit value of the predetermined temperature range, and decreases the rotation speed of the pump in a case in which the temperature detected by the temperature sensor is lower than a lower limit value of the predetermined temperature range. According to the third aspect, for example, in the case in which the demanded temperature with respect to the heat medium fluctuates at the secondary usage point, the rotation speed of the pump is increased or decreased to adjust the amount of heat absorption in the evaporator. With this arrangement, the temperature of the heat medium used for the secondary purpose after radiating heat to heat the working fluid may be adjusted appropriately.

A fourth aspect of the present disclosure provides a combined heat and power system wherein, in addition to the second aspect, the controller increases the rotation speed of the expander in a case in which the pressure determined according to the result of the detection by the sensor is higher than an upper limit value of the predetermined pressure range, and decreases the rotation speed of the expander in a case in which the pressure determined according to the result of the detection by the sensor is lower than a lower limit value of the predetermined pressure range. According to the fourth aspect, for example, in the case in which the pressure of the working fluid at the inlet of the expander varies due to variation in the rotation speed of the pump, the pressure of the working fluid at the inlet of the expander may be adjusted to be in a desired range enabling power generation with high power-generating efficiency.

A fifth aspect of the present disclosure provides a combined heat and power system provided with, in addition to the first aspect, a fan that is controlled by the controller and that causes air to cool the condenser, wherein the condenser cools the working fluid by heat exchange between the working fluid and the air. According to the fifth aspect, by controlling the fan with the controller, the pressure on the low-pressure side of the working fluid in the Rankine cycle may be adjusted, making it easier to further raise the power-generating efficiency of the Rankine cycle.

A sixth aspect of the present disclosure provides a combined heat and power system wherein, in addition to the fifth aspect, the controller increases the rotation speed of the fan in a case in which the temperature detected by the temperature sensor is higher than an upper limit value of a predetermined temperature range, and decreases the rotation speed of the fan in a case in which the temperature detected by the temperature sensor is lower than a lower limit value of the predetermined temperature range. According to the sixth aspect, when there is a high possibility that the flow rate of the working fluid in the Rankine cycle passage will vary, the rotation speed of the fan may be adjusted to match the vary, and the pressure on the low-pressure side of the working fluid in the Rankine cycle may be adjusted to a desired pressure.

A seventh aspect of the present disclosure is
an operating method of the combined heat and power system of the first aspect, the operating method comprising:
determining whether or not the temperature detected by the temperature sensor is inside a predetermined temperature range;
changing a rotation speed of the pump in a case in which the temperature is not inside the predetermined temperature range;
determining whether or not a pressure determined according to the result of the detection by the sensor after changing the rotation speed of the pump is inside a predetermined pressure range; and
changing the rotation speed of the expander in a case in which the pressure is not inside the predetermined pressure range.

According to the seventh aspect, after the rotation speed of the pump is changed, it is determined whether or not the pressure determined according to the result of the detection by the sensor is inside a predetermined pressure range, and if the pressure is not inside the predetermined pressure range, the rotation speed of the expander is changed. For this reason, after changing the rotation speed of the pump, the rotation speed of the expander is adjusted appropriately on the basis of the pressure determined according to the result of the detection by the sensor.

Hereinafter, an exemplary embodiment of the present disclosure will be described with reference to the drawings. The following description illustrates a combined heat and power system of the present disclosure as a representative example, but the present disclosure is not limited to the following embodiment.

As illustrated in FIG. 1, a combined heat and power system 1a is provided with a Rankine cycle passage 3, a heat medium passage 2, an evaporator 16, an expander 11, a condenser 13, a pump 14, a temperature sensor 20, a sensor 22, and a controller 5. Hereinafter, the combined heat and power system 1a will also be referred to as the CHP system 1a. Working fluid flows in the Rankine cycle passage 3. Heat medium supplied from a heat source flows in the heat medium passage 2. The evaporator 16 is disposed in the Rankine cycle passage 3. The evaporator 16 directly or indirectly receives the heat from the heat medium to heat the working fluid. The expander 11 is disposed in the Rankine cycle passage 3. The expander 11 expands the working fluid flowing from the evaporator 16 to generate rotational power. The condenser 13 is disposed in the Rankine cycle passage 3. The condenser 13 cools working fluid flowing from the expander 11. The pump 14 is disposed in the Rankine cycle passage 3. The pump 14 pumps the working fluid flowing from the condenser 13 to the evaporator 16. The temperature sensor 20 detects the temperature of the heat medium after radiating heat for heating the working fluid. The sensor 22 is a sensor for determining the pressure of the working fluid flowing between the outlet of the evaporator 16 and the inlet of the expander 11 in the Rankine cycle passage 3. The controller 5 adjusts the rotation speed of the pump 14 on the basis of the temperature detected by the temperature sensor 20, and in addition, adjusts the rotation speed of the expander 11 on the basis of the pressure determined according to the result of the detection by the sensor 22.

Generally, the CHP system 1a is configured to utilize the heat energy of the heat medium flowing in the heat medium passage 2 to obtain heated water and power at the same time. Note that "at the same time" means that power may be supplied while also supplying heated water. As illustrated in FIG. 1, for example, the CHP system 1a is additionally provided with a generator 12, and the generator 12 is connected to the rotating shaft of the expander 11. With this arrangement, the generator 12 generates power by the rotational power generated by the expander 11.

The heat source that supplies the heat medium to the heat medium passage 2 is not particularly limited, and may be waste heat or terrestrial heat. For example, heated water, high-temperature steam, or high-temperature oil is generated due to a fluid such as water or oil absorbing heat such as waste heat or terrestrial heat, and the generated high-temperature water, high-temperature steam, or high-temperature oil is utilized as the heat medium. Note that the heat source may also be a boiler. In this case, combustion gas produced in the boiler is utilized as the heat medium.

As illustrated in FIG. 1, for example, part of the heat medium passage 2, namely a first passage 2a, exists inside the evaporator 16. In this case, the heat medium and the working fluid exchange heat in the evaporator 16, by which the heat medium is cooled, and the working fluid is heated. The heat medium cooled by passing through the first passage 2a is utilized for a secondary purpose such as supplying hot water and indoor heating. For example, in the case in which the heat medium is heated water, the heat medium passage 2 is connected to a fixtures such as a shower, a faucet, a heating radiator, and a hot water tank. Also, in the case in which the heat medium is oil, or a gas such as air, the CHP system 1a additionally may be provided with a heat exchanger (not illustrated) that generates heated water by exchanging heat between the heat medium flowing from the first passage 2a and water. With this arrangement, heated water is supplied to fixtures such as a shower and a faucet. In this way, the heat energy of the heat medium is supplied indirectly to the secondary usage point.

For example, the evaporator 16 heats the working fluid by directly receiving the heat from the heat medium flowing through the heat medium passage 2. In this case, by exchanging heat between the heat medium and the working fluid in the evaporator 16, the working fluid is heated. In this case, the evaporator 16 is disposed straddling the heat medium passage 2 and the Rankine cycle passage 3, and inside the evaporator 16, the first passage 2a and a part of the Rankine cycle passage 3, namely a second passage 16a, exist. The evaporator 16 may also heat the working fluid by indirectly receiving the heat from the heat medium flowing through the heat medium passage 2. In this case, for example, the working fluid may also be heated by exchanging heat between the heat medium flowing through the heat medium passage 2 and a secondary medium in a separate heat exchanger, and then exchanging heat between the secondary medium that has received the heat from the heat medium and the working fluid. For example, the evaporator 16 is a common heat exchanger, such as a plate heat exchanger, a double pipe heat exchanger, or a finned tube heat exchanger.

The expander 11 is a displacement expander or a turbo expander, for example. A displacement expander may be a scroll expander, a rotary expander, a screw expander, or a reciprocating expander, for example. A turbo expander may be an expansion turbine, for example. Typically, a displacement expander exhibits high efficiency over a wider range of rotation speeds than a turbo expander. For example, a displacement expander is also capable of running at a rotation speed of half the rated rotation speed or less while still maintaining high efficiency. In other words, a displacement expander is able to lower the power output to half the rated power output or less while still maintaining high efficiency. Since a displacement expander has such characteristics, if the expander 11 is a displacement expander, flexible handling of variations in the power output associated with variations in the circulating flow and the temperature of the working fluid becomes possible. Also, the power output may be increased or decreased while still maintaining high efficiency with respect to variations in the power demand.

The condenser 13 is an air-cooled or liquid-cooled heat exchanger, for example. In the case in which the condenser 13 is an air-cooled heat exchanger, the condenser 13 is desirably a finned tube heat exchanger. In the case in which the condenser 13 is a liquid-cooled heat exchanger, the condenser 13 may be a plate heat exchanger or a double pipe heat exchanger, for example. In this way, an appropriate heat exchanger is selected as the condenser 13 in accordance with the type of medium for cooling the working fluid. In the case in which the condenser 13 is a liquid-cooled heat exchanger, water or oil may be used as the coolant.

In the case in which the condenser 13 is an air-cooled heat exchanger, as illustrated in FIG. 1, the CHP system 1a desirably is additionally provided with a fan 17. The fan 17 is controlled by the controller 5, and causes air to cool the condenser 13. The condenser 13 cools the working fluid by exchanging heat between the working fluid and air. Note that in the case in which the condenser 13 is a liquid-cooled heat exchanger, a liquid pump (not illustrated), for example, is used to pump coolant to the condenser 13.

As illustrated in FIG. 1, the CHP system 1a is provided with a motor 15, for example. The rotating shaft of the motor 15 is connected to the pump 14. The motor 15 drives the pump 14. The pump 14 is a typical displacement or turbo pump. The displacement pump may be a piston pump, a gear pump, a vane pump, or a rotary pump, for example. The turbo pump may be a centrifugal pump, a diagonal flow pump, or an axial flow pump, for example.

The working fluid flowing in the Rankine cycle passage 3 is not particularly limited, but may be an organic working fluid, for example. Ordinarily, organic working fluids have a low boiling point. For this reason, if an organic working fluid is used, even if the temperature of the high-temperature fluid supplied to the evaporator 16 to heat the working fluid is less than approximately 300° C., power is generated with high efficiency. The organic working fluid is an organic compound such as halogenated hydrocarbon or hydrocarbon, for example. The halogenated hydrocarbon is R-134a, R-245fa, R-1234ze, or R-356mfc, for example. The hydrocarbon is an alkane such as propane, butane, pentane, or isopentane, for example. These organic compounds may be used individually as the organic working fluid, or a mixture of two or more organic compounds may be used. The working fluid flowing in the Rankine cycle passage 3 may also be an inorganic compound such as water, carbon dioxide, or ammonia, for example.

As described above, the heat medium after radiating heat for heating the working fluid is used for a secondary purpose such as indoor heating or supplying hot water. For this reason, the temperature of the heat medium after radiating heat for heating the working fluid is desirably a temperature suited to the heat demand at the secondary usage point and the demanded temperature with respect to the heat medium. Accordingly, in the CHP system 1a, the controller 5 adjusts the rotation speed of the pump 14 on the basis of the temperature detected by the temperature sensor 20. Specifically, for example, the controller 5 acquires information indicating the temperature detected by the temperature sensor 20, and on the basis of the information, generates and transmits a control signal to the motor 15. The controller 5 is a digital signal processor (DSP) including an ND converter circuit, an input/output circuit, a computational circuit, and a storage device, for example. To be able to acquire the information indicating the temperature detected by the temperature sensor 20, the controller 5 is connected to the temperature sensor 20 in a wired or wireless manner. Also, to be able to receive the control signal from the controller 5, the motor 15 is connected to the controller 5 in a wired or wireless manner.

When the rotation speed of the pump 14 is changed, the pressure of the working fluid at the inlet of the expander 11 varies. For this reason, for the Rankine cycle to be able to exhibit high power-generating efficiency, for example, the CHP system 1a adjusts the rotation speed of the expander 11 on the basis of a pressure determined according to the result of the detection by the sensor 22. Specifically, the controller 5 acquires information indicating the result of the detection by the sensor 22, and on the basis of the information, generates and transmits a control signal to the generator 12. In this case, for example, the load imposed on the rotating shaft of the expander 11 is adjusted, and the rotation speed of the expander 11 is adjusted. To be able to acquire the information indicating the result of the detection by the sensor 22, the controller 5 is connected to the sensor 22 in a wired or wireless manner. Also, to be able to receive the control signal from the controller 5, the generator 12 is connected to the controller 5 in a wired or wireless manner.

In this way, in the CHP system 1a, the rotation speed of the pump 14 may be adjusted on the basis of the temperature detected by the temperature sensor 20. With this arrangement, the circulating flow of the working fluid in the Rankine cycle passage 3 may be varied, and the quantity of heat recovered by the working fluid in the evaporator 16 may be adjusted. For this reason, the temperature of the heat medium after radiating heat for heating the working fluid may be adjusted in a desirable temperature range corresponding to the heat demand at the secondary usage point. In addition, the rotation speed of the expander 11 may be adjusted on the basis of the pressure determined according to the result of the detection by the sensor 22. With this arrangement, the pressure of the working fluid at the inlet of the expander 11 may be adjusted to a desired pressure. For this reason, since the pressure of the working fluid at the inlet of the expander 11 may be adjusted to a desired pressure irrespectively of the adjustment of the circulating flow of the working fluid, the power-generating efficiency of the Rankine cycle may be kept high consistently.

For example, by adjusting the rotation speed of the pump 14, the controller 5 keeps the temperature detected by the temperature sensor 20 inside a predetermined temperature range. In addition, by adjusting the rotation speed of the expander 11, the controller 5 keeps the pressure determined according to the result of the detection by the sensor 22 inside a predetermined pressure range. The predetermined temperature range is determined according to the heat demand at the secondary usage point of the heat medium, for example. Also, the predetermined pressure range is set to a range suitable for exhibiting high power-generating efficiency in the Rankine cycle, for example. For this reason, through the adjustment of the rotation speed of the pump 14 by the controller 5, the temperature of the heat medium supplied for the secondary purpose after radiating heat to heat the working fluid may be kept in a suitable temperature range depending on the heat demand. Additionally, by adjusting the rotation speed of the expander 11, the pressure of the working fluid at the inlet of the expander 11 may be kept in a pressure range suited to high power-generating efficiency.

For example, the controller 5 increases the rotation speed of the pump 14 in the case in which the temperature detected by the temperature sensor 20 is higher than an upper limit value of the above predetermined temperature range. In this case, for example, the increase step in the rotation speed of the pump 14 is determined so that the increase step in the rotation speed of the pump 14 becomes larger as the difference obtained by subtracting the upper limit value of the predetermined temperature range from the temperature detected by the temperature sensor 20 becomes larger. In addition, the controller 5 decreases the rotation speed of the pump 14 in the case in which the temperature detected by the temperature sensor 20 is lower than a lower limit value of the above predetermined temperature range. For example, the decrease step in the rotation speed of the pump 14 is determined so that the decrease step in the rotation speed of the pump 14 becomes larger as the difference obtained by subtracting the temperature detected by the temperature sensor 20 from the lower limit value of the predetermined temperature range becomes larger. With this arrangement, for example, in the case in which the demanded temperature with respect to the heat medium varies at the secondary usage point, the rotation speed of the pump 14 is increased or decreased to adjust the amount of heat absorption in the evaporator 16. As a result, the temperature of the heat medium used for the secondary purpose after radiating heat to heat the working fluid may be adjusted appropriately.

For example, the controller 5 increases the rotation speed of the expander 11 in the case in which the pressure determined according to the result of the detection by the sensor 22 is higher than an upper limit value of the above predetermined pressure range. In this case, for example, the increase step in the rotation speed of the expander 11 is determined so that the increase step in the rotation speed of the expander 11 becomes larger as the difference obtained by subtracting the upper limit value of the predetermined pressure range from the pressure determined according to the result of the detection by the sensor 22 becomes larger. In addition, the controller 5 decreases the rotation speed of the expander 11 in the case in which the pressure determined according to the result of the detection by the sensor 22 is lower than a lower limit value of the above predetermined pressure range. In this case, for example, the decrease step in the rotation speed of the expander 11 is determined so that the decrease step in the rotation speed of the expander 11 becomes larger as the difference obtained by subtracting the pressure determined according to the result of the detection by the sensor 22 from the lower limit value of the predetermined pressure range becomes larger. With this arrangement, for example, in the case in which the pressure of the working fluid at the inlet of the expander 11 varies due to variation in the rotation speed of the pump 14, the pressure of the working fluid at the inlet of the expander 11 may be adjusted to be in a desired range enabling power generation with high power-generating efficiency.

As above, the fan 17 is controlled by the controller 5. With this arrangement, the pressure on the low-pressure side in the Rankine cycle (that is, the pressure of the working fluid at the inlet of the pump 14) may be adjusted to a desired pressure, making it easier to raise the power-generating efficiency of the Rankine cycle. For example, in the case in which the demanded temperature of the heat medium falls at the secondary usage point, and the circulating flow of the working fluid in the Rankine cycle passage 3 increases, the rotation speed of the fan 17 may be increased to thereby increase the amount of radiated heat in the condenser 13. As a result, the pressure on the low-pressure side of the Rankine cycle may be lowered, and the power-generating efficiency of the Rankine cycle may be raised further. Particularly, the power-generating efficiency of the Rankine cycle may be raised further in times when the outdoor temperature is low, such as wintertime. On the other hand, in the case in which the demanded temperature of the heat medium rises at the secondary usage point, and the circulating flow of the working fluid in the Rankine cycle passage 3 decreases, the rotation speed of the fan 17 may be decreased to thereby decrease the amount of radiated heat in the condenser 13. As a result, the pressure on the low-pressure side of the Rankine cycle may be adjusted optimally. For this reason, the operating pressure of the Rankine cycle becomes appropriately, and the power-generating efficiency of the Rankine cycle is kept high. In addition, it is possible to avoid the biting of gas in the pump 14 occurring because the pressure on the low-pressure side of the Rankine cycle falls too low. With this arrangement, the reliability of the CHP system 1a may be improved. For example, to be able to receive the control signal from the controller 5, the fan 17 is connected to the controller 5 in a wired or wireless manner.

For example, the controller 5 increases the rotation speed of the fan 17 in the case in which the temperature detected by the temperature sensor 20 is higher than an upper limit value of a predetermined temperature range. On the other hand, the controller 5 decreases the rotation speed of the fan 17 in the case in which the temperature detected by the temperature sensor 20 is lower than a lower limit value of the predetermined temperature range. With this arrangement, when there is a high possibility that the flow rate of the working fluid in the Rankine cycle passage 3 will vary, the rotation speed of the fan 17 may be adjusted to match the variation.

The CHP system 1a runs in accordance with a running method that includes the following steps, for example.
(i) The controller 5 determines whether or not the temperature detected by the temperature sensor 20 is inside a predetermined temperature range.
(ii) If the temperature detected by the temperature sensor 20 is not inside the above predetermined temperature range, the rotation speed of the pump 14 is changed.
(iii) After changing the rotation speed of the pump 14, the controller 5 determines whether or not the pressure detected by the sensor 22 is inside a predetermined pressure range.
(iv) If the pressured detected by the sensor 22 after changing the rotation speed of the pump 14 is not inside the above predetermined pressure range, the rotation speed of the expander 11 is changed.

According to the above running method, after changing the rotation speed of the pump 14, the rotation speed of the expander 11 is adjusted appropriately on the basis of the pressure determined according to the result of the detection by the sensor 22.

Typically, the sensor 22 is a pressure sensor, and detects the pressure of the working fluid flowing between the outlet of the evaporator 16 and the inlet of the expander 11. In this case, the controller 5 determines and handles the result of the detection by the sensor 22 directly as the pressure of the working fluid flowing between the outlet of the evaporator 16 and the inlet of the expander 11. The sensor 22 may also be a pair of temperature sensors rather than a pressure sensor. In this case, the pair of temperature sensors detects the temperature of the working fluid on the inlet side of the expander 11. In addition, the pair of temperature sensors additionally detects at least one temperature selected from the group consisting of the temperature of the working fluid on the outlet side of the expander 11, the temperature of the working fluid on the outlet side or the inlet side of the evaporator, and the temperature on the outlet side or the inlet side of the condenser. In this case, the controller 5 acquires the detection result of the sensor 22, namely the pair of sensors, and from the detection result, computationally determines the pressure of the working fluid flowing between the outlet of the evaporator 16 and the inlet of the expander 11.

As illustrated in FIG. 1, the CHP system 1a additionally is provided with a temperature sensor 21, a temperature sensor 23, and a temperature sensor 24, for example. The temperature sensor 21 detects the temperature of the working fluid flowing between the outlet of the evaporator 16 and the inlet of the expander 11. The temperature sensor 23 detects the temperature of the working fluid flowing between the outlet of the condenser 13 and the inlet of the pump 14. The temperature sensor 24 detects the temperature of the air sent to the condenser 13 by the fan 17. To be able to receive information indicating the detection results of the temperature sensor 21, the temperature sensor 23, and the temperature sensor 24, the controller 5 is connected to these temperature sensors in a wired or wireless manner.

For example, a program for appropriately running the CHP system 1a is stored in the controller 5. For example, the controller 5 is a single controller that controls the CHP system 1a as a whole. However, the controller 5 may also be configured by combining a first controller for controlling the Rankine cycle and a second controller for controlling other control targets.

Next, an example of the operation of the CHP system 1a will be described. The CHP system 1a is launched in accordance with the following procedure, for example. First, the fan 17 is activated, and air is sent into the condenser 13. After that, the motor 15 is activated at an appropriate time, and the pump 14 is activated. With this arrangement, working fluid begins to circulate in the Rankine cycle passage 3. When the circulating flow of the working fluid reaches a predetermined level, heat medium (for example, heated water) is supplied from the heat source to the heat medium passage 2, and made to pass through the first passage 2a. In the case in which the temperature of the heat medium is lower than the temperature of decomposition of the working fluid in the Rankine cycle, heat medium may also be supplied to the heat medium passage 2 before the pump 14 is activated. The working fluid receives the heat from the heat medium in the evaporator 16, and changes to the gas phase in a superheated state. The high-temperature working fluid in the gas phase is sent to the expander 11, and expands in the expander 11. With this arrangement, the pressure energy of the working fluid is converted into mechanical energy which drives the generator 12. As a result, power is generated in the generator 12. The working fluid exiting the expander 11 enters the condenser 13. In the condenser 13, the working fluid is cooled and condensed by air sent by the fan 17. The condensed working fluid is pressurized by the pump 14, and once again sent to the evaporator 16. Note that, for example, the heat medium (for example, heated water) passing through the first passage 2a is sent to a secondary usage point such as a shower to supply hot water.

In the case in which the demanded temperature with respect to the heat medium supplied to the secondary usage point changes, the CHP system 1a operates as follows, for example.

Figure 2A:
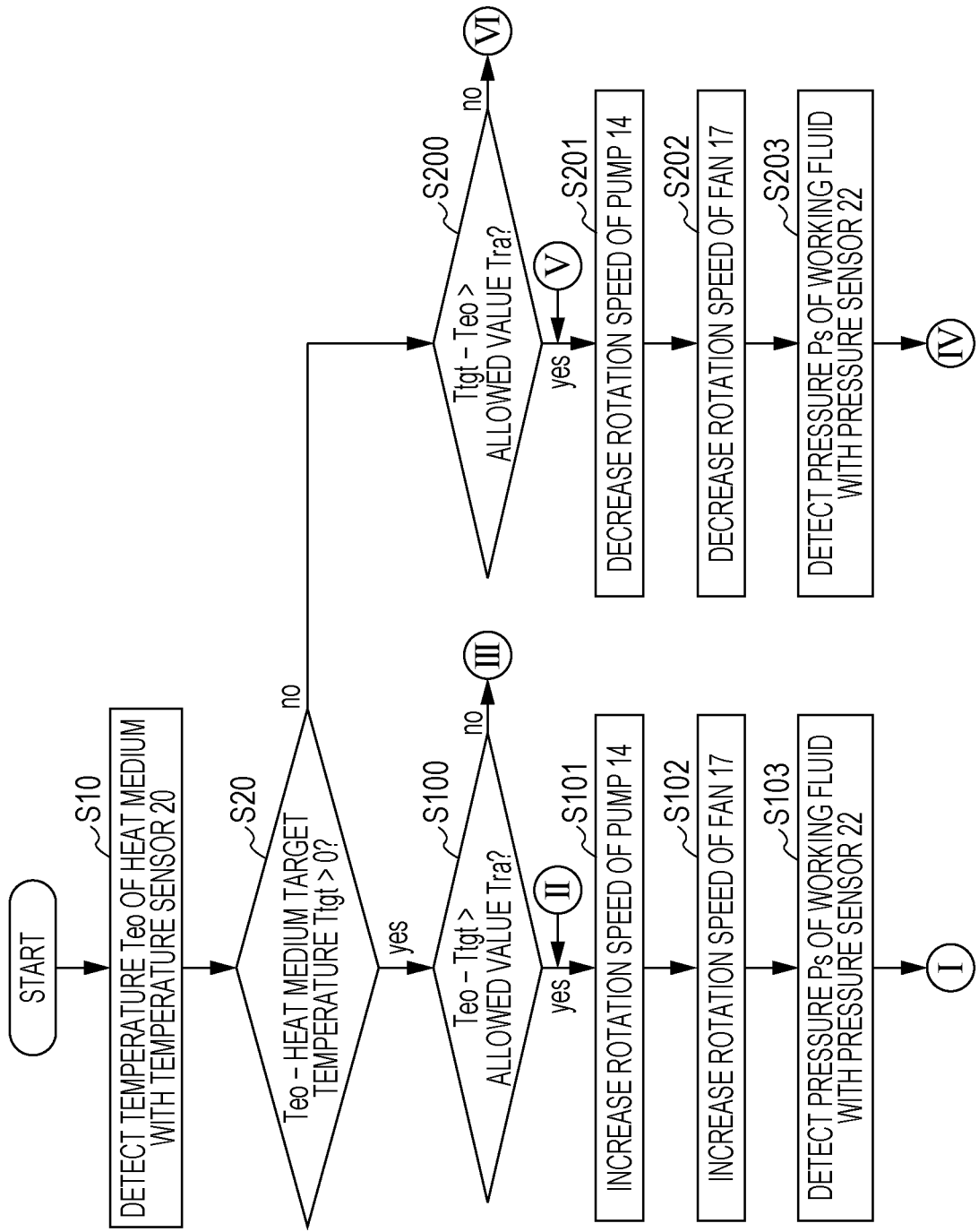
Figure 2C:
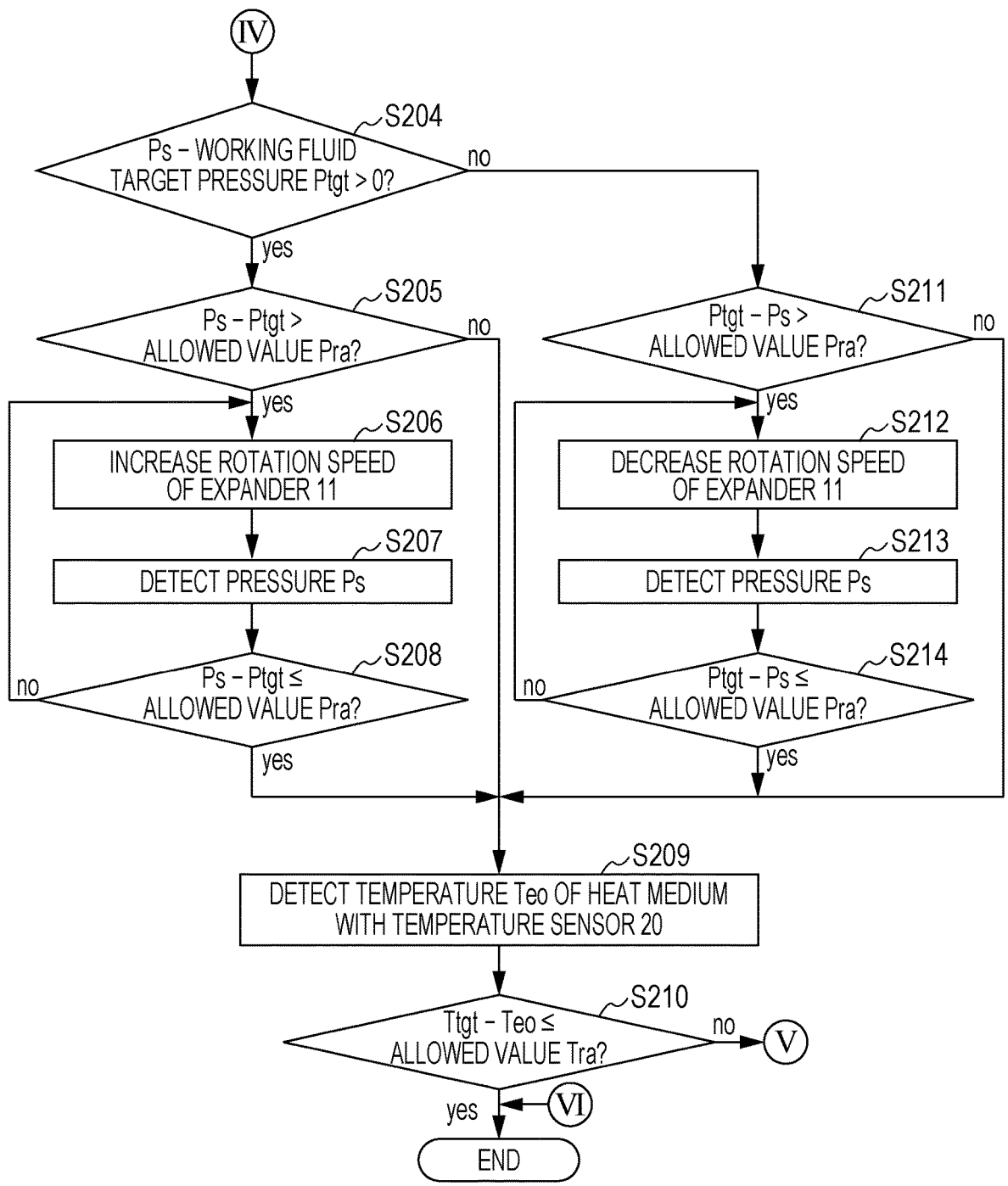

As illustrated in FIGS. 2A to 2C, first, in step S10, the temperature Teo of the heat medium flowing from the first passage 2a is detected by the temperature sensor 20, and the controller 5 acquires the temperature Teo of the heat medium. Next, proceeding to step S20, the controller 5 determines whether or not the difference obtained by subtracting a target temperature Ttgt of the heat medium from the temperature Teo of the heat medium is a positive value. Typically, the target temperature Ttgt of the heat medium is decided in accordance with the demanded temperature with respect to the heat medium at the secondary usage point. In the case in which the determination result in step S20 is affirmative, the flow proceeds to step S100, and it is determined whether or not the difference obtained by subtracting the target temperature Ttgt from the temperature Teo is greater than an allowed value Tra. In the case in which the determination result in step S100 is negative, the series of processes ends. On the other hand, in the case in which the determination result in step S100 is affirmative, the flow proceeds to step S101, and the rotation speed of the pump 14 is increased. Next, proceeding to step S102, the rotation speed of the fan 17 is increased. Note that step S102 may also be omitted as necessary. Next, proceeding to step S103, the pressure Ps of the working fluid flowing between the outlet of the evaporator 16 and the inlet of the expander 11 is detected by the sensor 22, and the controller 5 acquires the pressure Ps of the working fluid.

Next, proceeding to step S104, it is determined whether or not the difference obtained by subtracting a target pressure Ptgt of the working fluid from the pressure Ps of the working fluid is a positive value. Typically, the target pressure Ptgt of the working fluid is decided from the perspective of achieving high power-generating efficiency in the Rankine cycle. For example, the controller 5 executes computation based on a preset table from specific measured values, such as temperature and pressure, in the CHP system 1a, and decides the target pressure Ptgt of the working fluid. In the case in which the determination result in step S104 is affirmative, the flow proceeds to step S105, and it is determined whether or not the difference obtained by subtracting the target pressure Ptgt of the working fluid from the pressure Ps of the working fluid is greater than an allowed value Pra. In the case in which the determination result in step S105 is negative, the flow proceeds to step S109. On the other hand, in the case in which the determination result in step S105 is affirmative, the flow proceeds to step S106, and the rotation speed of the expander 11 is increased. Next, proceeding to step S107, the pressure Ps of the working fluid is detected by the sensor 22, and the controller 5 acquires the pressure Ps of the working fluid. Next, proceeding to step S108, it is determined whether or not the difference obtained by subtracting a target pressure Ptgt of the working fluid from the pressure Ps of the working fluid is the allowed value Pra or less. In the case in which the determination result in step S108 is affirmative, the flow proceeds to step S109. In the case in which the determination result in step S108 is negative, the flow returns to step S106, and the rotation speed of the expander 11 is increased further.

In the case in which the determination result in step S104 is negative, the flow proceeds to step S111, and it is determined whether or not the difference obtained by subtracting the pressure Ps of the working fluid from the target pressure Ptgt of the working fluid is greater than the allowed value Pra. In the case in which the determination result in step S111 is negative, the flow proceeds to step S109. On the other hand, in the case in which the determination result in step S111 is affirmative, the flow proceeds to step S112, and the rotation speed of the expander 11 is decreased. Next, proceeding to step S113, the pressure Ps of the working fluid is detected by the sensor 22, and the controller 5 acquires the pressure Ps of the working fluid. Next, proceeding to step S114, it is determined whether or not the difference obtained by subtracting the pressure Ps of the working fluid from the target pressure Ptgt of the working fluid is the allowed value Pra or less. In the case in which the determination result in step S114 is affirmative, the flow proceeds to step S109. In the case in which the determination result in step S114 is negative, the flow returns to step S112, and the rotation speed of the expander 11 is decreased further.

In step S109, the temperature Teo of the heat medium is detected again by the temperature sensor 20, and the controller 5 acquires the temperature Teo of the heat medium again. Next, proceeding to step S110, it is determined whether or not the difference obtained by subtracting the target temperature Ttgt of the heat medium from the reacquired temperature Teo of the heat medium is the allowed value Tra or less. In the case in which the determination result in step S110 is affirmative, the series of processes ends. In the case in which the determination result in step S110 is negative, the flow returns to step S101.

In the case in which the determination result in step S20 is negative, the flow proceeds to step S200, and it is determined whether or not the difference obtained by subtracting the temperature Teo from the target temperature Ttgt is greater than the allowed value Tra. In the case in which the determination result in step S200 is negative, the series of processes ends. On the other hand, in the case in which the determination result in step S200 is affirmative, the flow proceeds to step S201, and the rotation speed of the pump 14 is decreased. Next, proceeding to step S202, the rotation speed of the fan 17 is decreased. Note that step S202 may also be omitted as necessary. Next, proceeding to step S203, the pressure Ps of the working fluid flowing between the outlet of the evaporator 16 and the inlet of the expander 11 is detected by the sensor 22, and the controller 5 acquires the pressure Ps of the working fluid.

Next, proceeding to step S204, it is determined whether or not the difference obtained by subtracting a target pressure Ptgt of the working fluid from the pressure Ps of the working fluid is a positive value. In the case in which the determination result in step S204 is affirmative, the flow proceeds to step S205, and it is determined whether or not the difference obtained by subtracting the target pressure Ptgt of the working fluid from the pressure Ps of the working fluid is greater than the allowed value Pra. In the case in which the determination result in step S205 is negative, the flow proceeds to step S209. On the other hand, in the case in which the determination result in step S205 is affirmative, the flow proceeds to step S206, and the rotation speed of the expander 11 is increased. Next, proceeding to step S207, the pressure Ps of the working fluid is detected by the sensor 22, and the controller 5 acquires the pressure Ps of the working fluid. Next, proceeding to step S208, it is determined whether or not the difference obtained by subtracting a target pressure Ptgt of the working fluid from the pressure Ps of the working fluid is the allowed value Pra or less. In the case in which the determination result in step S208 is affirmative, the flow proceeds to step S209. In the case in which the determination result in step S208 is negative, the flow returns to step S206, and the rotation speed of the expander 11 is increased further.

In the case in which the determination result in step S204 is negative, the flow proceeds to step S211, and it is determined whether or not the difference obtained by subtracting the pressure Ps of the working fluid from the target pressure Ptgt of the working fluid is greater than the allowed value Pra. In the case in which the determination result in step S211 is negative, the flow proceeds to step S209. On the other hand, in the case in which the determination result in step S211 is affirmative, the flow proceeds to step S212, and the rotation speed of the expander 11 is decreased. Next, proceeding to step S213, the pressure Ps of the working fluid is detected by the sensor 22, and the controller 5 acquires the pressure Ps of the working fluid. Next, proceeding to step S214, it is determined whether or not the difference obtained by subtracting the pressure Ps of the working fluid from the target pressure Ptgt of the working fluid is the allowed value Pra or less. In the case in which the determination result in step S214 is affirmative, the flow proceeds to step S209. In the case in which the determination result in step S214 is negative, the flow returns to step S212, and the rotation speed of the expander 11 is decreased further.

In step S209, the temperature Teo of the heat medium is detected again by the temperature sensor 20, and the controller 5 acquires the temperature Teo of the heat medium again. Next, proceeding to step S210, it is determined whether or not the difference obtained by subtracting the reacquired temperature Teo of the heat medium from target temperature Ttgt of the heat medium is the allowed value Tra or less. In the case in which the determination result in step S210 is affirmative, the series of processes ends. In the case in which the determination result in step S210 is negative, the flow returns to step S201.

For example, with this arrangement, in the case in which the demanded temperature with respect to the heat medium at the secondary usage point changes, the CHP system 1a adjusts the temperature of the heat medium supplied to the secondary usage point and the pressure of the working fluid at the inlet of the expander 11 to a desired range.

<Modifications>

The CHP system 1a is modifiable from a variety of perspectives. For example, the CHP system 1a may also be modified to the CHP system 1b illustrated in FIG. 3. Unless specifically noted otherwise, the CHP system 1b is configured similarly to the CHP system 1a. The structural elements of the CHP system 1b which are identical or corresponding to the structural elements of the CHP system 1a are denoted with the same signs as the structural elements of the CHP system 1a, and a detailed description may be omitted. The description regarding the CHP system 1a also applies to the CHP system 1b, unless the result is technologically inconsistent.

Figure 3:
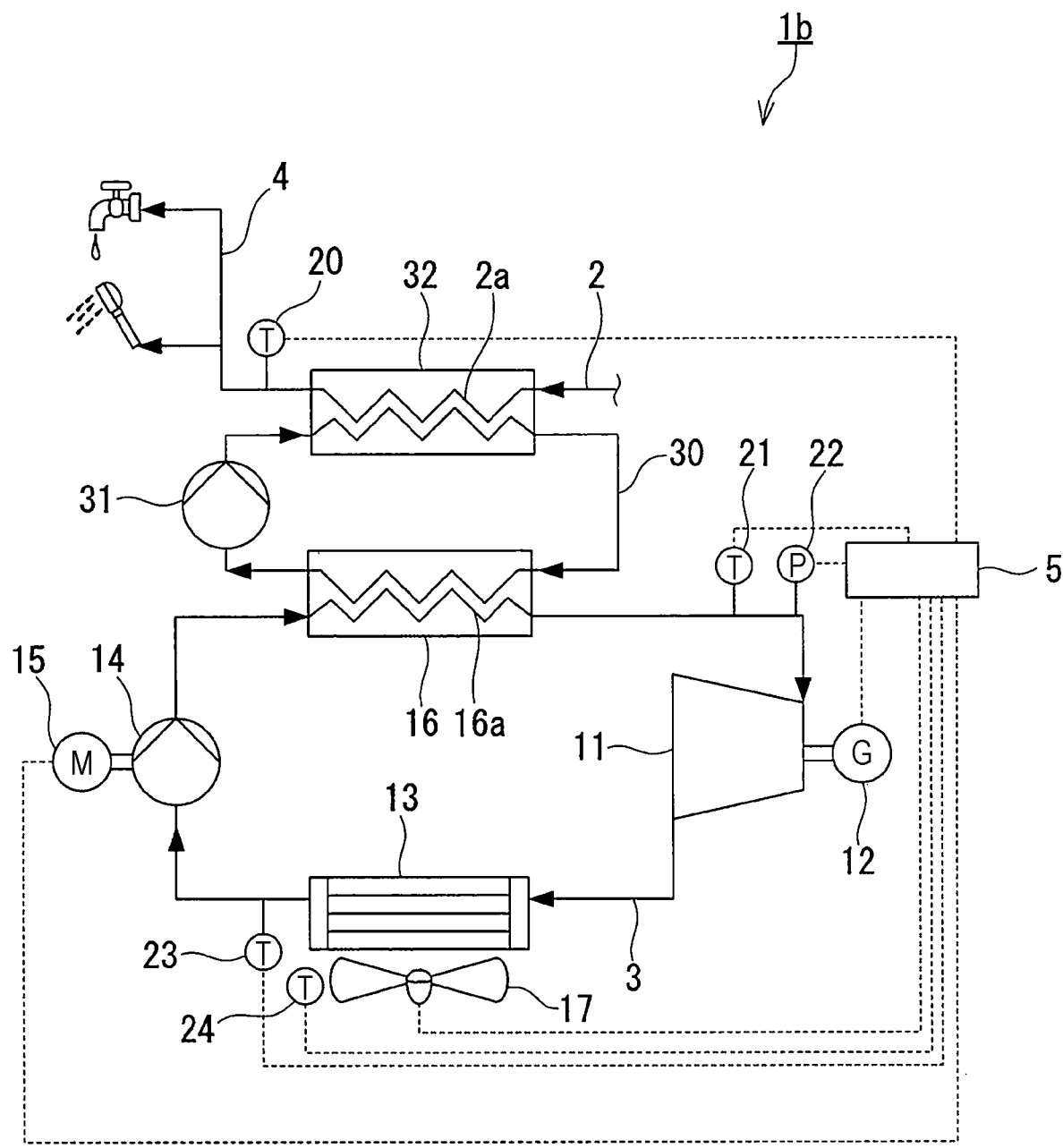
FIG. 3 is a configuration diagram illustrating another example of a combined heat and power system of the present disclosure.
Figure 4:
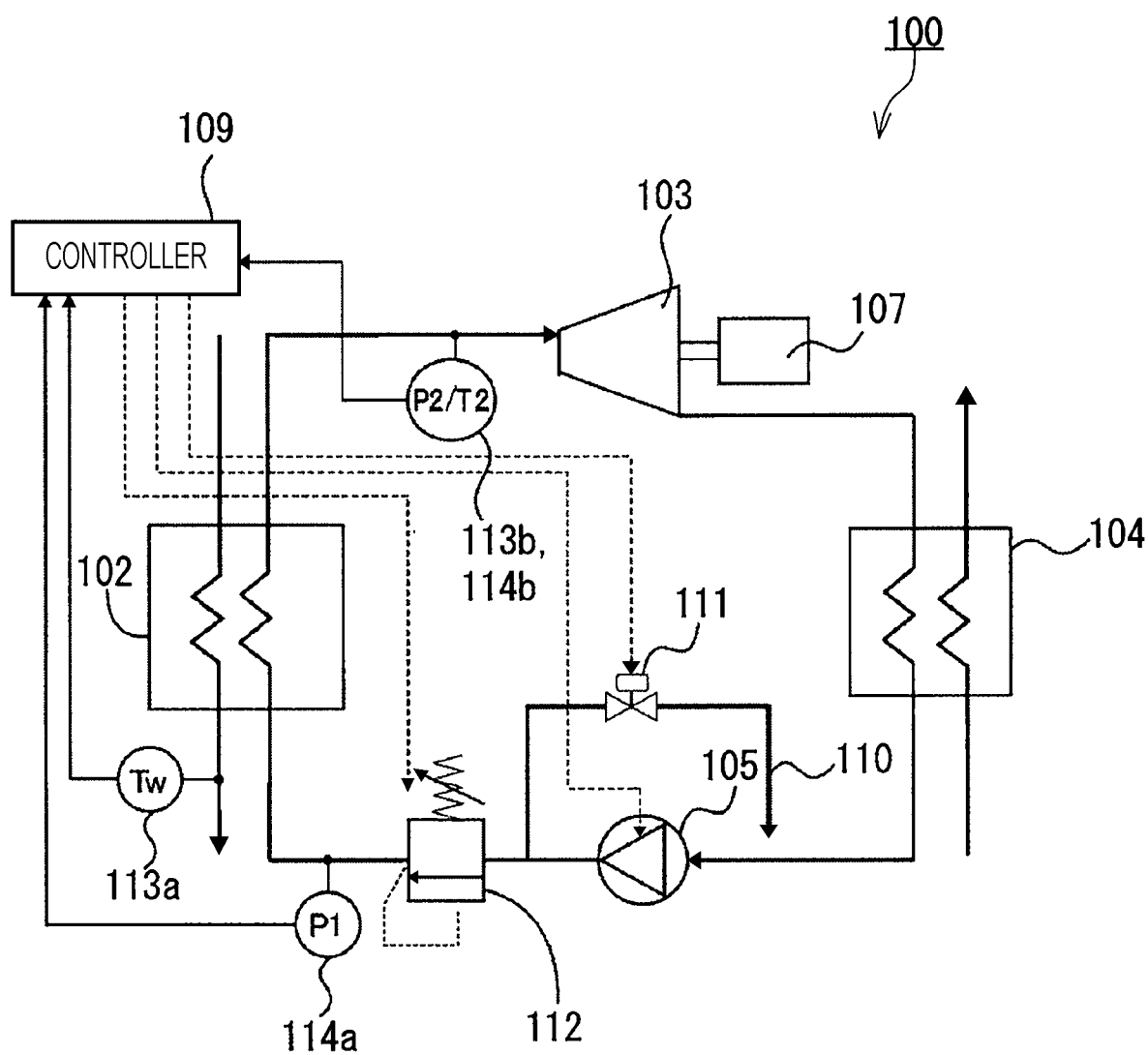
FIG. 4 is a configuration diagram illustrating a binary power generator of the related art.

As illustrated in FIG. 3, the CHP system 1b is provided with a secondary circuit 30, a second pump 31, and a heat exchanger 32. The secondary circuit 30 is a circuit for supplying the heat energy of the heat medium flowing in the heat medium passage 2 to the evaporator 16. A secondary medium such as oil flows in the secondary circuit 30. The secondary medium is a medium for heating the working fluid. In the secondary circuit 30, the second pump 31 pumps the secondary medium to the heat exchanger 32. The heat exchanger 32 is disposed straddling the secondary circuit 30 and the heat medium passage 2, and exchanges heat between the secondary medium and the heat medium, thereby heating the secondary medium while cooling the heat medium. The evaporator 16 is disposed straddling the Rankine cycle passage 3 and the secondary circuit 30. Secondary medium passing through the heat exchanger 32 enters the evaporator 16. In the evaporator 16, by exchanging heat between the secondary medium and the working fluid, the working fluid is heated. Meanwhile, the secondary medium is cooled. The cooled secondary medium passing through the evaporator 16 is once again pumped to the heat exchanger 32 by the second pump 31.

For example, the heat exchanger 32 is a common heat exchanger, such as a plate heat exchanger, a double pipe heat exchanger, or a finned tube heat exchanger. The second pump 31 is a typical displacement or turbo pump, for example. The displacement pump may be a piston pump, a gear pump, a vane pump, or a rotary pump, for example. The turbo pump may be a centrifugal pump, a diagonal flow pump, or an axial flow pump, for example.

As above, in the heat exchanger 32, the secondary medium absorbs heat energy from the heat medium flowing in the heat medium passage 2, while in the evaporator 16, the secondary medium radiates heat to the working fluid in the Rankine cycle passage 3. In other words, the working fluid of the Rankine cycle passage 3 receives heat energy emitted from the heat medium via the secondary medium. In this way, even in the CHP system 1b, similarly to the CHP system 1a, by varying the circulating flow of the working fluid in the Rankine cycle passage 3, and adjusting the quantity of heat recovered in the evaporator 16, the temperature of the heat medium after radiating heat to heat the working fluid may be adjusted. For this reason, when there is a change in the demanded temperature with respect to the heat medium at the secondary usage point, similarly to the CHP system 1a, the CHP system 1b is able to run the Rankine cycle with consistently high power-generating efficiency while also adjusting the temperature of the heat medium after radiating heat to heat the working fluid to a desired temperature range.

Note that in the CHP system 1b, the temperature sensor 20 detects the temperature of the heat medium, but the temperature sensor 20 may also detect the temperature of the secondary medium flowing between the outlet of the evaporator 16 and the inlet of the heat exchanger 32 in the secondary circuit 30. In such a modification, by considering the secondary medium to be the heat medium, such a modification is also encompassed by claim 1. In other words, the heat exchanger 32 corresponds to the heat source, and also to the secondary usage point of the heat medium, namely the secondary medium.

The technology of the present disclosure may be adopted favorably in a combined heat and power system in which the temperature of heat is varied as necessary. Such a combined heat and power system is suitable for installation in small-scale facilities, general households, and the like.

What is claimed is:

1. A combined heat and power system comprising:
a Rankine cycle passage in which a working fluid flows;
a heat medium passage in which a heat medium supplied from a heat source flows;
an evaporator that is disposed in the Rankine cycle passage and that directly or indirectly receives heat from the heat medium to heat the working fluid;
an expander that is disposed in the Rankine cycle passage and that expands the working fluid flowing from the evaporator to generate rotational power;
a condenser that is disposed in the Rankine cycle passage and that cools the working fluid flowing from the expander;
a pump that is disposed in the Rankine cycle passage and that pumps the working fluid flowing from the condenser to the evaporator;
a temperature sensor that detects a temperature of the heat medium after radiating heat for heating the working fluid; and
a controller that controls a rotation speed of the pump based on (1) the temperature detected by the temperature sensor and (2) a temperature required for an external fixture configured to utilize heat energy of the heat medium after heating the working fluid.

2. The combined heat and power system according to claim 1, further comprising:
a fan that is controlled by the controller and that causes air to cool the condenser, wherein
the condenser cools the working fluid by heat exchange between the working fluid and the air.

3. The combined heat and power system according to claim 2, wherein the controller
increases the rotation speed of the fan in a case in which the temperature detected by the temperature sensor is higher than an upper limit value of a predetermined temperature range, and
decreases the rotation speed of the fan in a case in which the temperature detected by the temperature sensor is lower than a lower limit value of the predetermined temperature range.

4. The combined heat and power system according to claim 1 further comprising a sensor for determining a pressure of the working fluid flowing between an outlet of the expander and an inlet of the expander in the Rankine cycle passage, wherein
the controller controls a rotation speed of the expander based on the pressure determined based on a result of a detection by the sensor.

5. The combined heat and power system according to claim 4, wherein the controller
adjusts the rotation speed of the pump to keep the temperature detected by the temperature sensor inside a predetermined temperature range, and
adjusts the rotation speed of the expander to keep the pressure determined according to the result of the detection by the sensor inside a predetermined pressure range.

6. The combined heat and power system according to claim 5, wherein the controller
increases the rotation speed of the pump in a case in which the temperature detected by the temperature sensor is higher than an upper limit value of the predetermined temperature range, and
decreases the rotation speed of the pump in a case in which the temperature detected by the temperature sensor is lower than a lower limit value of the predetermined temperature range.

7. The combined heat and power system according to claim 5, wherein the controller
increases the rotation speed of the expander in a case in which the pressure determined according to the result of the detection by the sensor is higher than an upper limit value of the predetermined pressure range, and
decreases the rotation speed of the expander in a case in which the pressure determined according to the result of the detection by the sensor is lower than a lower limit value of the predetermined pressure range.

8. An operating method of the combined heat and power system according to claim 4, the operating method comprising:
determining whether or not the temperature detected by the temperature sensor is inside a predetermined temperature range;
changing a rotation speed of the pump in a case in which the temperature is not inside the predetermined temperature range;
determining whether or not a pressure determined according to the result of the detection by the sensor after changing the rotation speed of the pump is inside a predetermined pressure range; and
changing the rotation speed of the expander in a case in which the pressure is not inside the predetermined pressure range.

9. The combined heat and power system according to claim 1, wherein the external fixture is a heating radiator.

10. The combined heat and power system according to claim 1, wherein the external fixture is a hot water supply.

11. The combined heat and power system according to claim 1, wherein the heat medium is a water.

12. The combined heat and power system according to claim 1, wherein the controller controls the rotation speed of the pump based on a value obtained by subtracting the temperature required for the external fixture from the temperature detected by the temperature sensor.

13. The combined heat and power system according to claim 12, wherein the controller
increases the rotation speed of the pump in a case in which the value is positive and the value is higher than a allowed value, and
decreases the rotation speed of the pump in a case in which the value is negative and an absolute value of the value is higher than the allowed value.

* * * * *